United States Patent
Ince et al.

(10) Patent No.: US 10,439,924 B2
(45) Date of Patent: Oct. 8, 2019

(54) SWITCHED MEASUREMENT PROBE FOR LARGE-SCALE BROADBAND PERFORMANCE MEASUREMENT

(71) Applicant: TIME WARNER CABLE ENTERPRISES LLC, New York, NY (US)

(72) Inventors: Kamil Ince, Herndon, VA (US); Howard Pfeffer, Reston, VA (US); Thomas M. Gaeble, Manlius, NY (US); Jason Weil, Ashburn, VA (US); Kevin A. Noll, Leesburg, VA (US); Ronald Kevin McNuss, Bristow, VA (US)

(73) Assignee: TIME WARNER CABLE ENTERPRISES LLC, St. Louis, MO (US)

( * ) Notice: Subject to any disclaimer, the term of this patent is extended or adjusted under 35 U.S.C. 154(b) by 321 days.

(21) Appl. No.: 14/083,542

(22) Filed: Nov. 19, 2013

(65) Prior Publication Data
US 2015/0138996 A1    May 21, 2015

(51) Int. Cl.
*H04L 12/26*    (2006.01)

(52) U.S. Cl.
CPC .............. *H04L 43/50* (2013.01); *H04L 43/12* (2013.01)

(58) Field of Classification Search
CPC ............ H04B 10/0793; H04B 10/0799; H04B 10/564; H04B 17/00; H04L 43/00; H04L 43/10; H04L 43/12; H04L 43/18; H04L 43/50
See application file for complete search history.

(56) References Cited

U.S. PATENT DOCUMENTS

| 8,937,870 | B1 * | 1/2015 | Callaghan | 370/243 |
| 9,258,237 | B1 * | 2/2016 | Smith | H04L 12/4633 |
| 2008/0219290 | A1 * | 9/2008 | Cioffi | H04L 5/1438 |
| | | | | 370/465 |
| 2010/0077079 | A1 * | 3/2010 | Xu | G06F 11/2294 |
| | | | | 709/226 |
| 2010/0309805 | A1 * | 12/2010 | Jones, Jr. | H04L 12/2801 |
| | | | | 370/252 |
| 2011/0096678 | A1 * | 4/2011 | Ketonen | H04L 41/147 |
| | | | | 370/252 |
| 2011/0131624 | A1 * | 6/2011 | Wu | H04L 41/0226 |
| | | | | 725/111 |
| 2011/0206367 | A1 * | 8/2011 | Gilbert | H04B 10/272 |
| | | | | 398/16 |
| 2011/0320885 | A1 * | 12/2011 | Owaki | G06F 11/277 |
| | | | | 714/48 |
| 2012/0294612 | A1 * | 11/2012 | Maeda | H04J 14/0258 |
| | | | | 398/51 |
| 2013/0266310 | A1 * | 10/2013 | Fox | H04L 25/08 |
| | | | | 398/25 |
| 2014/0093233 | A1 * | 4/2014 | Gao | H04B 10/0799 |
| | | | | 398/16 |

(Continued)

*Primary Examiner* — Michael Thier
*Assistant Examiner* — Prince A Mensah
(74) *Attorney, Agent, or Firm* — The Marbury Law Group, PLLC

(57) ABSTRACT

A single measurement agent installed at an aggregation point in a network is cycled through multiple network segments (or service groups) using a switching device. Detailed broadband measurement tests are performed on each network segment.

16 Claims, 6 Drawing Sheets

(56) References Cited

U.S. PATENT DOCUMENTS

2014/0119197 A1* 5/2014 Maca ................. H04B 17/0085
370/241
2015/0040121 A1* 2/2015 Barabash ............ G06F 9/45558
718/1

* cited by examiner

SWITCHED MEASUREMENT PROBE FOR LARGE-SCALE BROADBAND PERFORMANCE MEASUREMENT

BACKGROUND

The management of a broadband network that is shared by multiple users requires knowledge of the performance of the network components under a variety of conditions. Users of such networks expect dependable performance at promised levels. Network performance issues are expected to be resolved quickly.

Test agents may be installed at the user endpoint or may be installed in central locations. Test agents installed at the user endpoint provide data that may be affected by the way the network is configured at the endpoint, the type of equipment connected to the network at the endpoint, and the behavior of the user. Further, user endpoint test agents must be supported thereby adding to end-user support costs.

Moving the testing agents to a point of aggregation on the network, such as a hub, eliminates the support costs but does not alone improve the quality of the acquired performance data. Because of the cost of network probe systems and the costs of operating those systems, a limited number of network probes are installed at aggregation and are configured to test a sample of network components. The sample data are used to draw conclusions about the whole network.

To obtain comprehensive data about a network, a measurement agent would be required for each network termination device at each network endpoint or for each collection of end users with an aggregation point. In a typical fiber-to-the-premises (FTTP) network or cable network, for example, equipping every cable modem, optical network unit (sometimes also referred to as an optical network terminal or "ONT") or home gateway with a measurement agent would require millions of agents to be installed and maintained. A typical hub in a cable network or optical network may service forty or more service groups. In a network of a thousand hubs, installing and operating a measurement agent for each of the 40,000 service groups is prohibitively expensive.

SUMMARY

Embodiments are directed to a system and method for measuring broadband performance in large-scale broadband access networks.

In an embodiment, a single measurement agent installed at an aggregation point is cycled through multiple network segments (sometimes referred to as service groups) using a switching device. Detailed broadband measurement tests are performed on each network segment.

In an embodiment, a probe device perform operations that include selecting a service group for testing, selecting one or more tests to be performed on the selected service group, configuring a switch to connect a network termination device to upstream and downstream paths of the selected service group, sending upstream packets corresponding to the selected one or more tests to the upstream path of the selected service group via the network termination device, and receiving downstream packets in response to the upstream packets from the downstream path of the selected service group via the network termination device. The probe device may be further configured to connect to a management server and to deliver the downstream packets to the management server.

In an embodiment, the network is a hybrid-fiber coax network and the network termination device is a cable modem. The switch is configured by the probe device to connect the network termination device to upstream and downstream paths of the selected service group. The modem may be configured using a bootfile that sets one or more operational parameters of the modem. The tests may be selected to obtain one or more performance measures that correspond to the one or more operational parameters. For example, the operational parameters may include a downstream frequency, an upstream channel identifier, a maximum upstream transfer rate, a maximum downstream transfer rate, a traffic priority value, and a service flow value.

In another embodiment, the network is an optical network and the network termination device is an optical network unit (ONU). The switch is configured to connect the ONU to a switched port connected to an optical splitter assigned to the selected service group. The optical splitter provides access to the upstream and downstream paths assigned to the selected service group. The optical network unit may be configured using parameters sent to the ONU to the optical network unit by an optical line termination (OLT) system using operations administration management (OAM) messages. The tests may be selected to obtain one or more performance measures that correspond to the one or more operational parameters. For example, the operational parameters may include a maximum upstream transfer rate, a maximum downstream transfer rate, a traffic priority value, and a service flow value.

DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

The various embodiments are described in detail with reference to the accompanying drawings. Wherever possible, the same reference numbers are used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The term "IP network" is used generically herein to refer to IPv4 or IPv6 compatible networks.

Any references to terminology and/or technical details related to an individual wired or wireless communications standard or technology are for illustrative purposes only, and not intended to limit the scope of the claims to a particular communication system or technology unless specifically recited in the claim language.

Examples of wired IP network technologies and networks include cable networks, fiber optic networks, hybrid-fiber-cable networks, networks that implement the data over cable service interface specification (DOCSIS), networks that utilize asymmetric digital subscriber line (ADSL) technologies, etc. Each of these technologies involves, for example, the transmission and reception of data, signaling, and/or content messages.

A "service group" is one or more upstream and downstream frequency ranges that are combined to form a bidirectional communication path.

"Downstream" or "forward" refers to packets that are sent toward the end-user endpoint.

"Upstream" or "reverse" refers to packets that are sent from the end-user endpoint.

Certain embodiments herein may be illustrated by reference to a DOCSIS-compliant network. In such networks, downstream packets are transmitted in a high frequency band and upstream packets are transmitted in a low frequency band. Other embodiments may be illustrated by reference to an optical network. By way of illustration and not by way of limitation, an optical network may be a passive optical network (PON), an ethernet PON (or EPON) or other fiber-to-the-premises topology.

Figure 1:
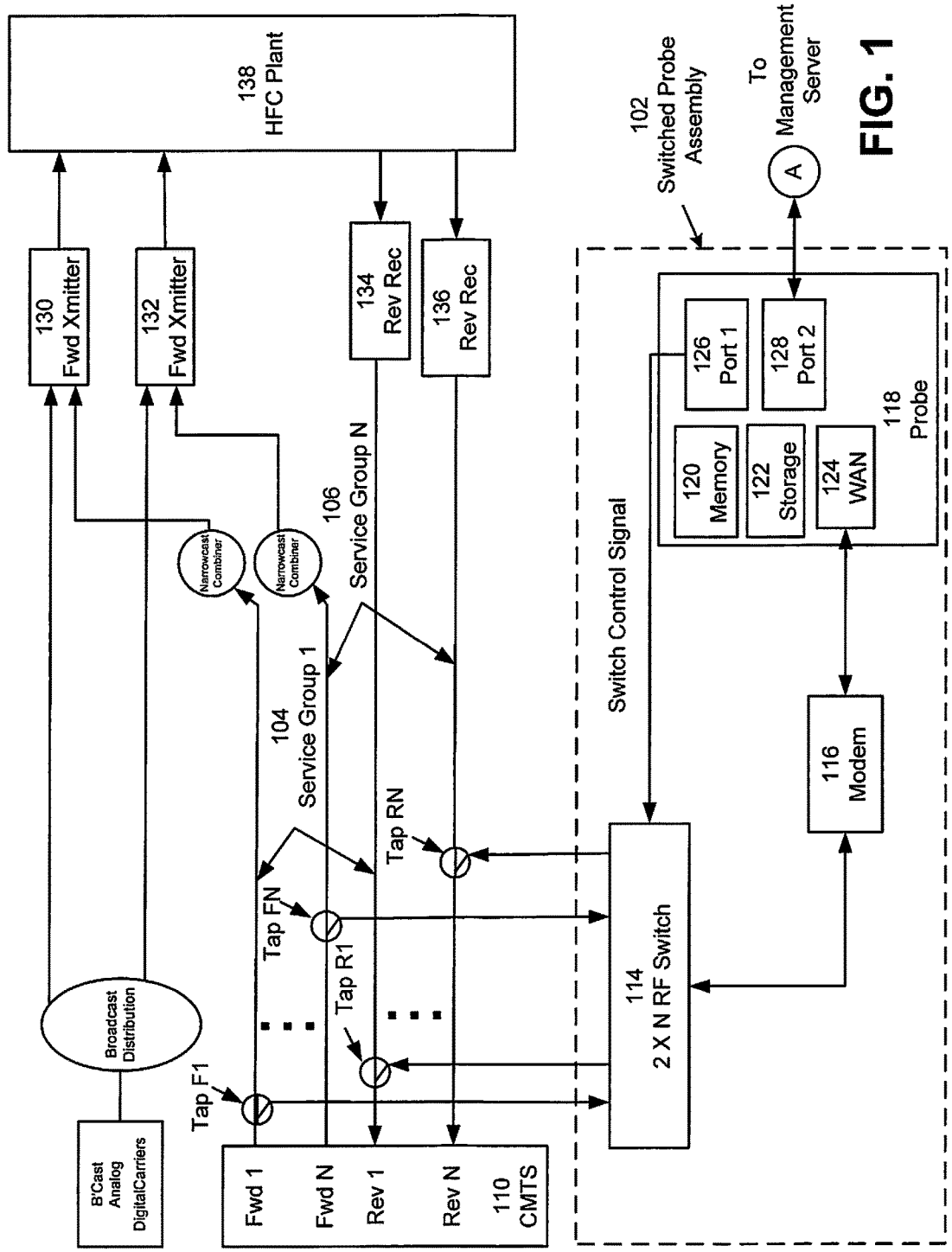
FIG. 1 is a block diagram illustrating a cable network hub configured with a switched probe assembly according to an embodiment.

FIG. 1 is a block diagram illustrating components of a cable network hub configured with a switched probe assembly according to an embodiment. As illustrated in FIG. 1, a cable modem termination system (CMTS) 110 supports "N" service groups. For example, a 2×16 switch may support 16 service groups. For ease of discussion only two service groups 104 (service group 1) and 106 (service group N) are illustrated.

Packets directed to service group 1 (104) customers are provided by the CMTS to forward transmitter 130 and sent downstream via the hybrid fiber cable (HFC) plant 138. Packets from service group 1 (104) customers (upstream packets) are received from the HFC plant 138 by receiver 134 and provided to the CMTS 110. Packets directed to service group N (106) customers are provided by the CMTS to forward transmitter 132 and sent downstream via the hybrid fiber cable (HFC) plant 138. Packets from service group N (106) customers (upstream packets) are received from the HFC plant 138 by receiver 136 and provided to the CMTS 110.

A switched probe assembly 102 resides in the hub. The switched probe assembly 102 uses a network termination device, such as a modem 116, and a probe device 118 to test the 1-N service groups.

The modem 116 and the probe device 118 are configured as customer premises equipment. The configuration process is performed each time the modem 116 is switched to a new service group. In an embodiment, the modem 116 receives a new boot or configuration file that provides parameters that are used to configure the modem 116. A boot file may, for example, include parameters that establish a downstream frequency, an upstream channel identifier, a maximum upstream transfer rate, a maximum downstream transfer rate, a traffic priority value, a service flow value, and a number of device MAC addresses that the modem will service among others. The configuration parameters may be selected to differentiate among various service offerings (e.g., gold, silver, platinum). Tests may be selected to determine whether the advertised service differentiators are being achieved.

The modem 116 connects to an RF switch 114 via the modem RF port and connects to the probe device 118 via a WAN port 124. The modem receives and sends packets as a member of the service group to which the switch 114 is connected.

The probe device 118 operates software instructions stored in a memory 120 that when executed cause the probe device 118 to perform operations that include commanding the switch 114 to connect the upstream and downstream paths of a selected service group to the modem 116. The switch control signals are provided via an Ethernet port on probe device 118, such as, for example, port 1 126.

The memory 120 also stores software instructions that when executed cause the probe device 118 to perform operations that include making both active and passive network measurements of the selected service group. A non-limiting list of tests that may be run are provided in Table 1 below:

TABLE 1

| Metric | Primary Measure(s) |
| --- | --- |
| Web browsing | The total time taken to fetch a page and all of its resources from a popular website |
| Video streaming | The initial time to buffer, the number of buffer underruns and the total time for buffer delays |
| Voice over IP | Upstream packet loss, downstream packet loss, upstream jitter, downstream jitter, round trip latency |
| Download speed | Throughput in Megabits per second utilizing three concurrent TCP connections |
| Upload speed | Throughput in Megabits per second utilizing three concurrent TCP connections |
| UDP latency | Average round trip time of a series of randomly transmitted UDP packets |
| UDP packet loss | Percentage of UDP packets lost from latency test |
| DNS resolution | The time taken for the ISP's recursive DNS resolver to return an A record for a popular website domain name |
| Latency under load | The average round trip time for a series of regularly spaced UDP packets sent during downstream/upstream sustained tests |
| Consumption | A simple record of the total bytes downloaded and uploaded by the probe |

In an embodiment, a test protocol is run on each of the service groups 1 to N. At the completion of the test protocol, the service groups 1 to N may be tested again using the same protocol or the service groups may be tested using a different protocol.

In an embodiment, the probe device 118 incorporates a storage device to receive and log the results of the tests performed on the selected service group. In an embodiment, the probe device 118 is configured to access a management server (not illustrated) via an Ethernet port on probe device 118, such as, for example, port 2 128. The management server may include a storage device for receiving and logging test results. The management server may also be used to communicate with the probe device 118 to provide trouble shooting and emergency management functions and to interrupt automated test-cycles of the probes for ad-hoc tasks and RF-switch-port changes.

In an embodiment, the memory 120 stores software instructions that when executed cause the probe device 118 to perform operations that include analyzing the results of the tests performed on each of the service groups.

As illustrated in FIG. 1, the switch 114 provides N downstream and N upstream ports towards the CMTS 110 and a single-combined signal towards the modem 116. The ports are connected to the downstream paths of a particular service group via taps F1 through FN. The ports are connected to the upstream paths of a particular service group via taps R1 through RN.

Figure 2:
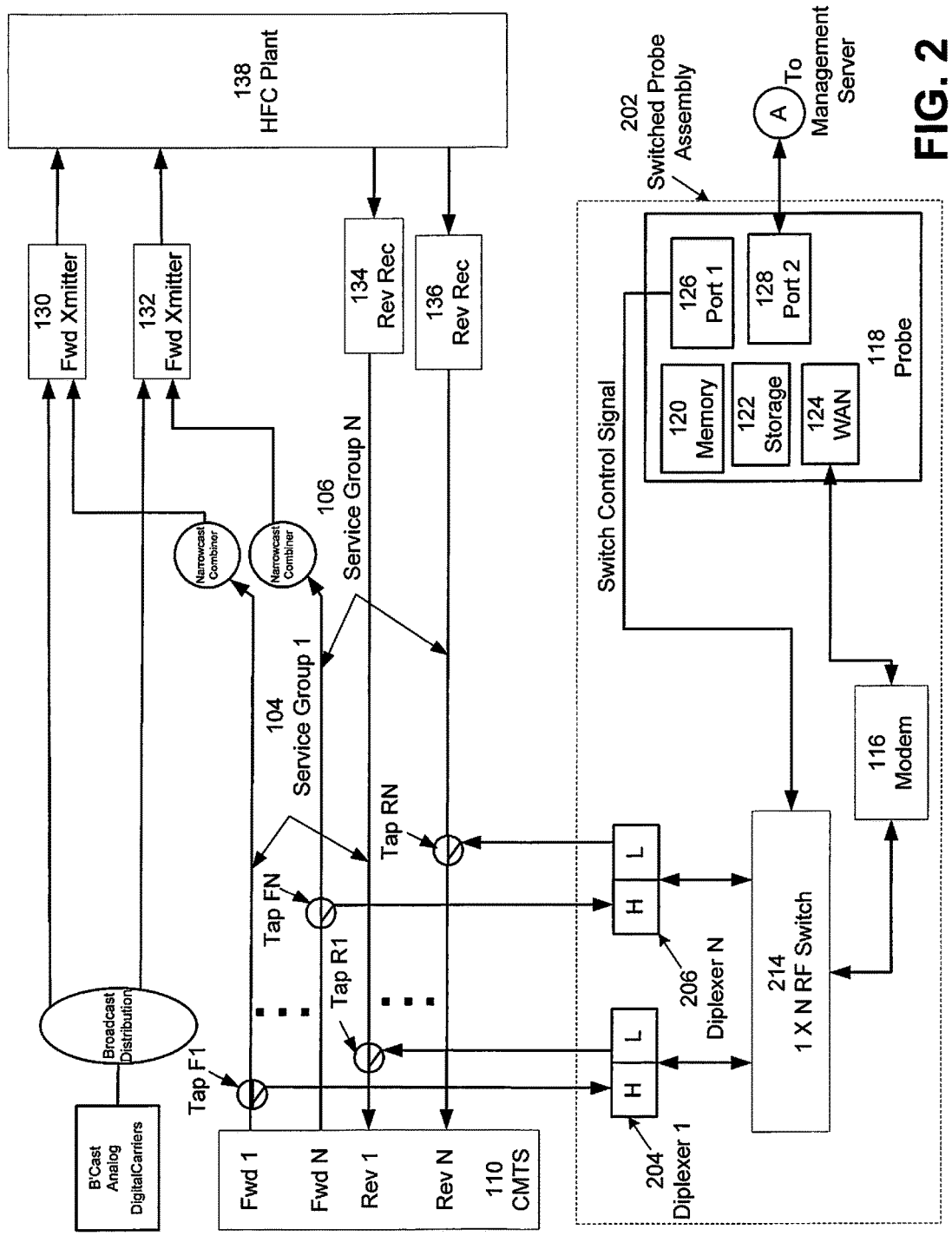
FIG. 2 is a block diagram illustrating a cable network hub configured with a switched probe assembly using diplexers on the output side of the switch according to an embodiment.

FIG. 2 is a block diagram illustrating components of a switched probe assembly using diplexers on the output side of the switch according to an embodiment. The switch 214 switches a connection from the network termination device, such as a modem 116, on the input port of the switch 214 to an output port of the switch 214. The output port of switch 214 is connected to the common port of one of N diplexers, for example diplexer 204. The diplexer isolates high bandwidth components (forward or downstream packets) from low bandwidth components (reversed or upstream packets) and enables the modem 116 to send and receive packets simultaneously.

Figure 3:
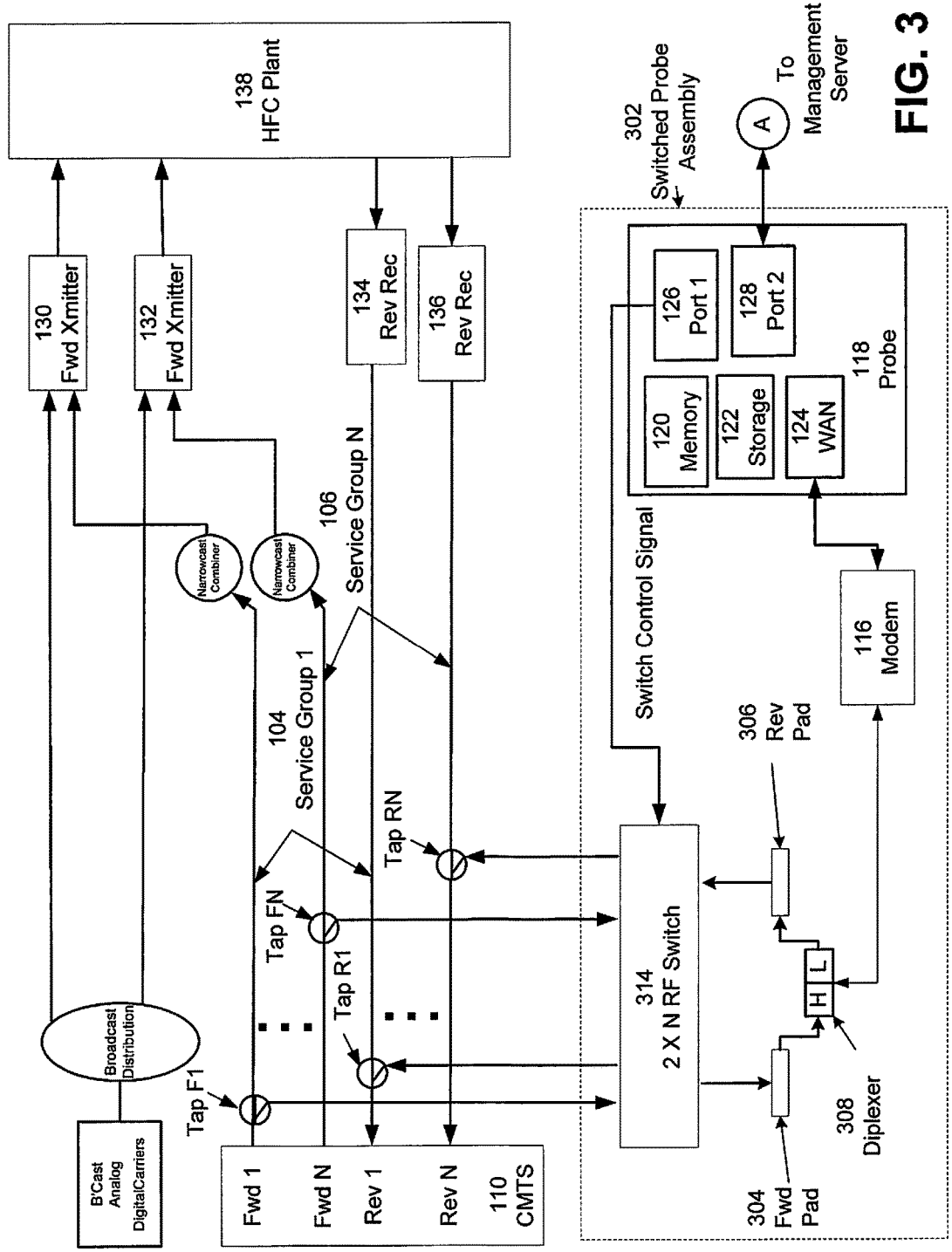
FIG. 3 is a block diagram illustrating a cable network hub configured with a switched probe assembly using diplexers on the input side of the switch according to an embodiment.

FIG. 3 is a block diagram illustrating components of a switched probe assembly using diplexers on the input side of the switch according to an embodiment. The output port of the network termination device, such as the modem 116, is connected to the common port of a diplexer 308. The diplexer 308 isolates high bandwidth components (forward or downstream packets) from low bandwidth components (reversed or upstream components) and enables the modem 116 to send and receive packets simultaneously. The high side of diplexer 308 is connected to a first input port on the switch 314 via a pad 304. The low side of the diplexer 308 is connected to a second port on the switch 314 via a pad 306. Ports on the output side of the switch 314 that are connected to the high bandwidth components (forward or downstream packets) are switched to the first input port that is connected to the high side of the diplexer 308 while ports on the output side of the switch 314 that are connected to the low bandwidth components (reverse or upstream packets) are switched to the second input port that is connected to the low side of the diplexer 308.

As indicated in FIGS. 1, 2, and 3, the probe device 118 includes a memory 120 in which software instructions may be stored, including software instructions for testing a network or a network segment. The test software may be acquired from a third party or may be customized. By way of illustration and not by way of limitation, the functions of the probe device 118 may be provided by a SamKnows probe assembly.

Figure 4:
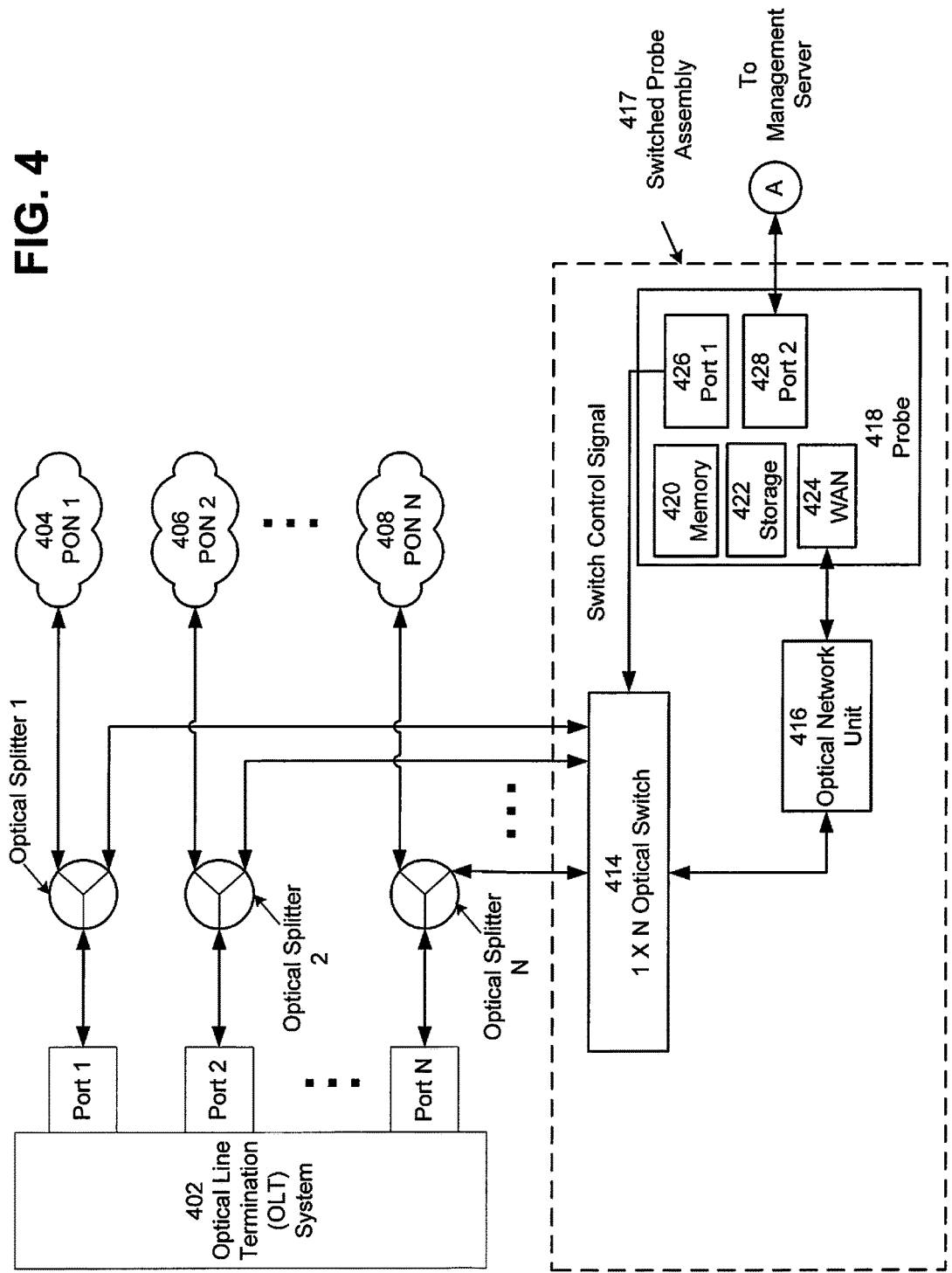
FIG. 4 is a block diagram illustrating an optical network hub configured with a switched probe assembly according to an embodiment.

FIG. 4 is a block diagram illustrating an optical network hub configured with a switched probe assembly according to an embodiment.

As illustrated in FIG. 4, an optical line termination (OLT) system 402 supports passive optical networks (PONs) 1 through N (404, 406 and 408). Each of the N PONs supports a group of subscribers that are referred to herein as a service group.

While the networks 1 through N are illustrated as PON networks, this is not meant as a limitation. For example, instead of the illustrated passive optical networks, active optical networks may be connected to the optical splitters 1 through N. Additionally, passive optical networks may utilize various network architectures, such as, for example, Ethernet PON, gigabit PON, secure PON, broadband PON, and ATM PON, may also be used.

Packets directed to service group 1 customers are provided by the OLT system 402 to optical splitter 1 and sent downstream via PON 1 (404). Packets from service group 1 customers (upstream packets) are received from the PON 1 (404) and provided to the OLT system 402. Packets directed to service group N (408) customers are provided to optical splitter N and sent downstream via PON N (408). Packets from service group N customers (upstream packets) are received from the PON N (408) and provided to the OLT system 402.

A switched probe assembly 417 resides in the hub. The switched probe assembly 417 uses a network termination device, such as an optical network unit (ONU) 416, and a probe device 418 to test the 1 through N service groups.

The ONU 416 and the probe device 418 are configured as customer premises equipment. The configuration process is performed each time the ONU 416 is switched to a new service group. During this process, the ONU 416 is reconfigured with parameters send to the ONU by the OLT using operations administration management (OAM) messages. The OAM message, may, for example, include parameters that establish a maximum upstream transfer rate, a maximum downstream transfer rate, a traffic priority value, a service flow value, and a number of device MAC addresses that the ONU will service among others. The configuration parameters may be selected to differentiate among various service offerings (e.g., gold, silver, platinum). Tests may be selected to determine whether the advertised service differentiators are being achieved.

The ONU 416 connects to an optical switch 414 via the ONU optical port and connects to the probe device 418 via a WAN port 424. The modem receives and sends packets as a member of the service group to which the switch 414 is connected.

The probe device 418 operates software instructions stored in a memory 420 that when executed cause the probe device 418 to perform operations that include commanding the switch 414 to connect the optical splitter associated with a selected service group to the ONU 416. The switch control signals are provided via an Ethernet port on probe device 418, such as, for example, port 1 426.

The memory 420 also stores software instructions that when executed cause the probe device 418 to perform operations that include making both active and passive network measurements of the selected service group.

Figure 5:
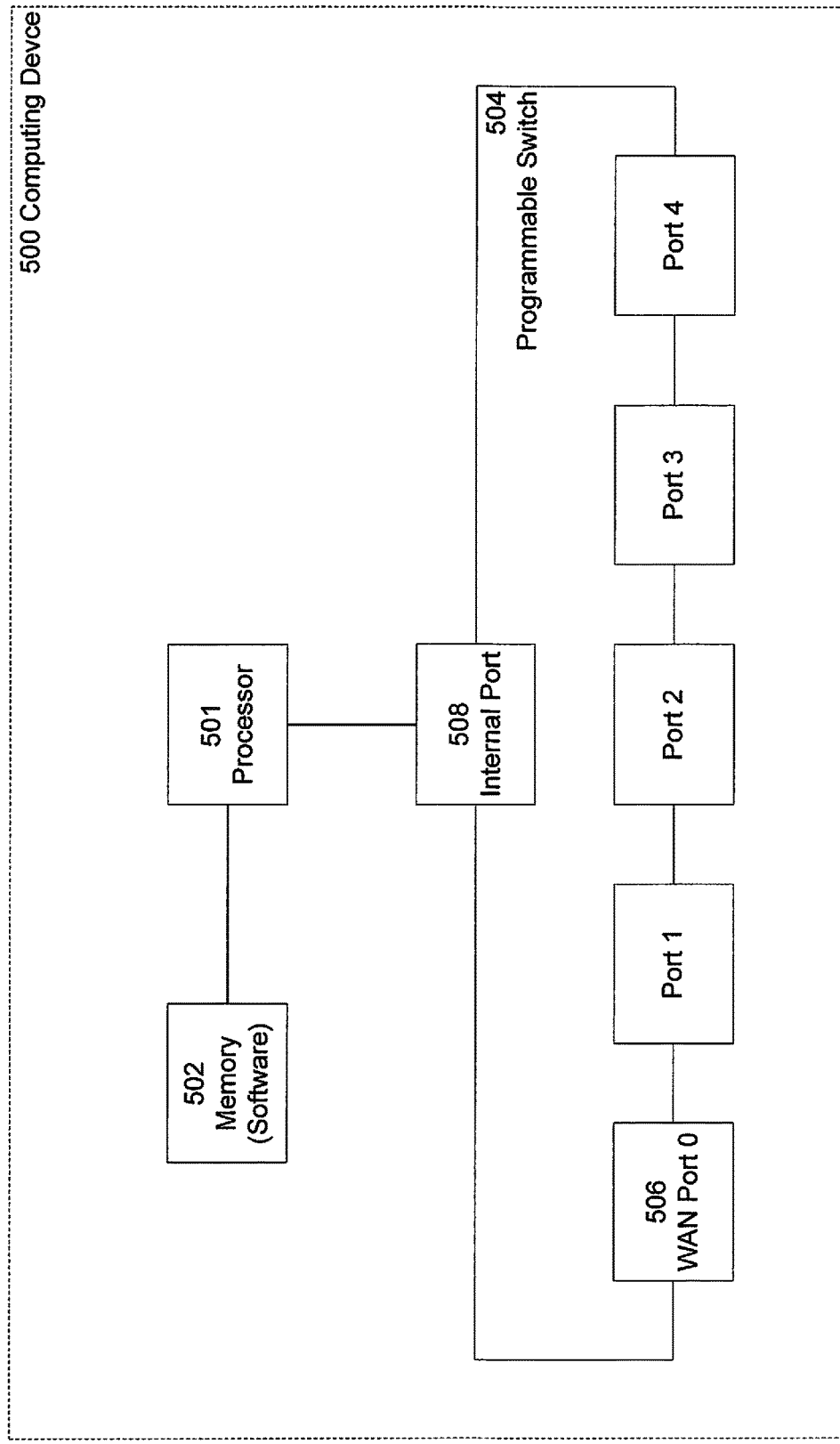
FIG. 5 is a system block diagram of a computing device suitable for use with various embodiments.

FIG. 5 is block diagram of a computing device 500 that may be configured to perform the functions of the probe 118. The five physical ports (ports 1-4 and WAN port 0 506) are mapped to virtual LANs (VLANS) and to an internal port 508 within the computing device. Memory 502 includes configurable software instructions that are executed by processor 501 to control the movement of traffic outside the domain of any VLAN via a programmable switch 504. In an embodiment, the software instructions within memory 502 is configured to provide routing and filtering logic to the computing device 500. The software instructions stored in memory 502 may also be configured to define two VLANs, one connected to port 1 (FIG. 1, 126) that carries instructions to a switch (such as switch 114 in FIG. 1 and optical switch 414 in FIG. 4) and the other to port 2 (FIG. 1, 128) to a management server. Memory 502 may also perform the functions assigned to memory 120 (FIG. 1).

Figure 6:
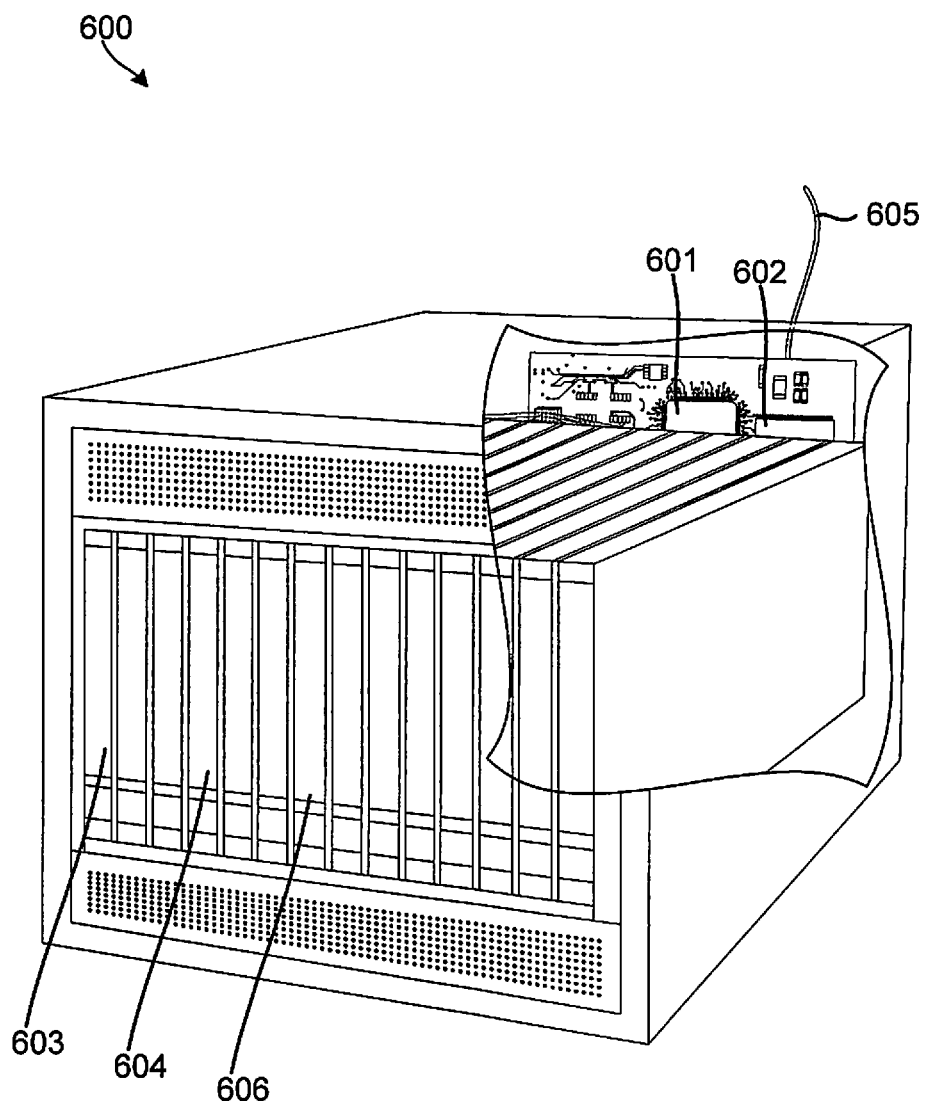
FIG. 6 is a system block of a server suitable for use with various embodiments.

The functions of the management server (FIG. 1, circle A) may be implemented on any of a variety of commercially available server devices, such as the server 600 illustrated in FIG. 6. Such a server 600 typically includes a processor 601 coupled to volatile memory 602 and a large capacity nonvolatile memory, such as a disk drive 603. The server 600 may also include a floppy disc drive, compact disc (CD) or DVD disc drive 604 coupled to the processor 601. The server 600 may also include network access ports 606 coupled to the processor 601 for establishing data connections with a network 605, such as a local area network coupled to other computers, servers, or components in a service provider network.

The processor 601 may be any programmable microprocessor, microcomputer or multiple processor chip or chips that can be configured by software instructions (applications) to perform a variety of functions, including the functions of the various embodiments described above. In some mobile receiver devices, multiple processors may be provided, such as one processor dedicated to wireless communication functions, one processor dedicated to video processing, and one processor dedicated to running other applications. Typically, software applications may be stored in the internal memory 602 before they are accessed and loaded into the processor 601. The processor 601 may include internal memory sufficient to store the application software instructions.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as hardware, software, or any combination thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

Embodiments implemented in computer software may be implemented in software, firmware, middleware, microcode, hardware description languages, or any combination thereof. A code segment or machine-executable instructions may represent a procedure, a function, a subprogram, a program, a process, a task, a tread, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. Non-transitory computer-readable or processor-readable media includes both computer storage media and tangible storage media that facilitate transfer of a computer program from one place to another. Non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a signal processing circuit that may be suitable for use in a wireless receiver or mobile device. Such a wireless signal processing circuit may include circuits for accomplishing the signal measuring and calculating steps described in the various embodiments.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A probe device for testing service groups of a broadband access network, the probe device comprising:
   a memory;
   a first port coupled to a network termination device;
   a second port coupled to a switch, wherein the switch is configured to be selectively connected to one of a plurality of service groups, each service group including an upstream path and a downstream path; and
   a processor configured with processor-executable instructions to perform operations comprising:
      selecting a service group for testing, each service group corresponding to a different segment of the broadband access network;
      selecting a broadband measurement test to be performed on a segment of the broadband access network corresponding to the selected service group, wherein the selected broadband measurement test comprises an active and a passive network measurement of the segment of the broadband access network corresponding to the selected service group;
      configuring the switch to connect the network termination device to upstream and downstream paths of the segment of the broadband access network corresponding to the selected service group;
      sending, as a member of the service group to which the switch is connected, upstream packets corresponding to the selected broadband measurement test to the upstream path of the segment of the broadband access network corresponding to the selected service group via the network termination device;
      receiving, in response to sending the upstream packets, downstream packets from the downstream path of the segment of the broadband access network corresponding to the selected service group via the network termination device;
      transmitting a configuration file to the network termination device in response to configuring the switch, wherein the network termination device sets an operational parameter of the network termination device according to the configuration file to differentiate among service offerings, the operational parameter selected from at least one of a downstream frequency, an upstream channel identifier, a maximum upstream transfer rate, and a maximum downstream transfer rate; and
      testing to determine whether the service offering associated with the selected operational parameter is achieved.

2. The probe device of claim 1, wherein the processor is further configured with processor-executable instructions to perform operations comprising:
   connecting to a management server; and
   transmitting the downstream packets to the management server.

3. The probe device of claim 1, wherein:
   the broadband access network is at least one of a cable network or a hybrid-fiber coax network;
   the network termination device is a cable modem; and
   the configuration file is a bootfile for the cable modem.

4. The probe device of claim 3,
   wherein the processor is configured with processor-executable instructions to perform operations such that configuring the switch to connect the network termination device to the upstream and downstream paths of the segment of the broadband access network corresponding to the selected service group comprises transmitting an instruction to the switch, and
   wherein the switch connects the cable modem to an upstream port connected to the upstream path and to a downstream port connected to the downstream path in response to receiving the instruction.

5. The probe device of claim 3, wherein the processor is configured with processor-executable instructions to perform operations such that selecting the broadband measurement test to be performed on the segment of the broadband access network corresponding to the selected service group comprises selecting at least one broadband measurement test to obtain a performance measure that corresponds to the operational parameter set by the cable modem.

6. The probe device of claim 1, wherein:
   the broadband access network is an optical network;
   the network termination device is an optical network unit; and
   the configuration file is a configuration message pertaining to the optical network.

7. The probe device of claim 6,
   wherein the processor is configured with processor-executable instructions to perform operations such that configuring the switch to connect the network termination device to the upstream and downstream paths of the segment of the broadband access network corresponding to the selected service group comprises transmitting an instruction to the switch,
   wherein the switch connects the optical network unit to a switched port connected to an optical splitter assigned to the selected service group, an
   wherein the optical splitter provides access to the upstream and downstream paths of the segment of the broadband access network corresponding to the selected service group in response to the instruction.

8. The probe device of claim 6, wherein the processor is configured with processor-executable instructions to perform operations such that selecting the broadband measurement test to be performed on the segment of the broadband access network corresponding to the selected service group comprises selecting at least one broadband measurement test to obtain a performance measure that corresponds to the operational parameter set by the optical network unit.

9. A method for testing service groups of a broadband access network, the method comprising:
   selecting, by a processor of a probe device, a service group for testing, each service group corresponding to a different segment of the broadband access network;
   selecting, by the processor of the probe device, a broadband measurement test to be performed on a segment of the broadband access network corresponding to the selected service group, wherein the selected broadband measurement test comprises an active and a passive network measurement of the segment of the broadband access network corresponding to the selected service group;
   configuring, by the processor of the probe device, a switch to connect a network termination device to upstream and downstream paths of the segment of the broadband access network corresponding to the selected service group, wherein the switch is configured to be selectively connected to one of a plurality of service groups, each service group including an upstream path and a downstream path;

sending, by the processor of the probe device, as a member of the service group to which the switch is connected, upstream packets corresponding to the selected broadband measurement test to the upstream path of the segment of the broadband access network corresponding to the selected service group via the network termination device;

receiving, by the processor of the probe device, in response to sending the upstream packets, downstream packets from the downstream path of the segment of the broadband access network corresponding to the selected service group via the network termination device;

transmitting a configuration file to the network termination device in response to configuring the switch, wherein the network termination device sets an operational parameter of the network termination device according to the configuration file to differentiate among service offerings, the operational parameter selected from at least one of a downstream frequency, an upstream channel identifier, a maximum upstream transfer rate, and a maximum downstream transfer rate; and testing to determine whether the service offering associated with the selected operational parameter is achieved.

10. The method of claim 9, further comprising:
transmitting, from the probe device, the downstream packets to a management server.

11. The method of claim 9, wherein:
the broadband access network is at least one of cable netowkr or a hybrid-fiber coax network;
the network termination device is a cable modem; and
the configuration file is a bootfile for the cable modem.

12. The method of claim 11, wherein:
configuring the switch to connect the network termination device to the upstream and downstream paths of the segment of the broadband access network corresponding to the selected service group comprises transmitting, by the processor of the probe device, an instruction to the switch; and the switch connects the cable modem to an upstream port connected to the upstream path and to a downstream port connected to the downstream path in response to receiving the instruction.

13. The method of claim 11, wherein selecting the broadband measurement test to be performed on the segment of the broadband access network corresponding to the selected service group comprises selecting at least one broadband measurement test to obtain a performance measure that corresponds to the operational parameter set by the cable modem.

14. The method of claim 9,
wherein the broadband access network is an optical network;
the network termination device is an optical network unit; and
the configuration file is a configuration message corresponding to the optical network.

15. The method of claim 14, wherein:
configuring the switch to connect the network termination device to the upstream and downstream paths of the segment of the broadband access network corresponding to the selected service group comprises transmitting, from the probe device, an instruction to the switch;

the switch connects the optical network unit to a switched port connected to an optical splitter assigned to the selected service group; and the optical splitter provides access to the upstream and downstream paths of the segment of the broadband access network corresponding to the selected service group in response to the instruction.

16. The method of claim 14, wherein selecting the broadband measurement test to be performed on the segment of the broadband access network corresponding to the selected service group comprises selecting at least one broadband measurement test to obtain a performance measure that corresponds to the operational parameter set by the optical network unit.

* * * * *